United States Patent
Clute

(10) Patent No.: US 7,469,928 B2
(45) Date of Patent: Dec. 30, 2008

(54) ADAPTIVE SEAT BELT SYSTEM

(75) Inventor: Gunter K. Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 340 days.

(21) Appl. No.: 11/342,782

(22) Filed: Jan. 30, 2006

(65) Prior Publication Data

US 2007/0176408 A1 Aug. 2, 2007

(51) Int. Cl.
*B60R 22/20* (2006.01)

(52) U.S. Cl. .................. 280/801.2; 280/806; 297/479

(58) Field of Classification Search .............. 280/801.2, 280/806, 807, 801.1, 808, 468, 474, 476–480
See application file for complete search history.

(56) References Cited

U.S. PATENT DOCUMENTS

| | | | | |
|---|---|---|---|---|
| 3,947,812 | A | * | 3/1976 | Lee et al. .................. 340/457 |
| 4,989,900 | A | | 2/1991 | Steinhüser |
| 5,271,578 | A | | 12/1993 | Jabusch |
| 5,366,243 | A | * | 11/1994 | Ray et al. ................. 280/801.2 |
| 5,566,978 | A | * | 10/1996 | Fleming et al. .......... 280/801.2 |
| 5,609,367 | A | * | 3/1997 | Eusebi et al. ............... 280/808 |
| 5,615,917 | A | * | 4/1997 | Bauer ......................... 280/806 |
| 5,626,359 | A | * | 5/1997 | Steffens et al. .............. 280/735 |
| 5,941,604 | A | | 8/1999 | Futschik et al. |
| 5,944,277 | A | | 8/1999 | Jabusch |
| 6,062,502 | A | | 5/2000 | Svensson |
| 6,659,505 | B1 | | 12/2003 | Knox |
| 6,719,325 | B2 | | 4/2004 | Ingemarsson |
| 6,726,287 | B1 | | 4/2004 | Janz |
| 2006/0006725 | A1 | * | 1/2006 | Gentner et al. .............. 297/479 |

FOREIGN PATENT DOCUMENTS

| | | | | |
|---|---|---|---|---|
| KR | | 2005040340 A | * | 5/2005 |
| KR | | 649309 B1 | * | 11/2006 |

* cited by examiner

*Primary Examiner*—Paul N. Dickson
*Assistant Examiner*—Drew J. Brown
(74) *Attorney, Agent, or Firm*—Sally J Brown; Brinks Hofer Gilson & Lione

(57) ABSTRACT

A safety restraint system for a vehicle is disclosed. The safety restraint system has a seat belt webbing for restraining an occupant of the vehicle, a seat belt retractor, a deflector, a height adjuster, a latch plate deflector, a buckle and a communication link. The seat belt retractor mounted to a first structural member of the vehicle for securing the seat belt to the vehicle and allowing protraction and retraction of the seat belt. The retractor has at least two load limiting modes. The deflector receives the seat belt webbing and directs the seat belt webbing across the shoulder of the occupant. The height adjuster secures the deflector to a second structural member of the vehicle. The deflector is positionable between at least two locations along the height adjuster. The latch plate deflector receives the seat belt webbing and redirects the seat belt webbing across the lap of the occupant. The buckle receives and removably secures the latch plate deflector when the seat belt is in use by the occupant. The communication link is attached at a first end adjacent the height adjuster and at a second end to the retractor for switching the retractor from at least one load limiting mode to another.

12 Claims, 2 Drawing Sheets

ADAPTIVE SEAT BELT SYSTEM

BACKGROUND OF THE INVENTION

The present invention relates to safety restraint systems and to seat belt restraints that are adjustable to accommodate occupants of different sizes.

BACKGROUND OF THE INVENTION

All road vehicles today are equipped with front and rear passenger seat belts. These conventional seat belt systems predominantly include a lap belt and a shoulder belt and in many cases the lap belt and shoulder belt is one continuous loop of webbing material. Typically, the seat belt webbing is attached a first end to a structural member of the vehicle. The seat belt webbing is then threaded through a slot in a latch plate that forms the lap belt portion of the seat belt when the latch plate is latched within the buckle. The seat belt webbing continues through the slot in the latch plate and across the chest of an occupant to a D-ring or guide that is typically mounted to the upper end of a B-pillar for front seat occupants. As conventionally known, the D-ring includes a slot for receiving the seat belt webbing and redirecting the webbing to a seat belt retractor typically mounted to the base of the B-pillar or other vehicle structure.

Over the years there have been many enhancements to vehicle seat belt systems. For example, in many cases the D-ring is mounted to a height adjuster that allows the D-ring to be raised or lowered along the B-pillar providing a more comfortable positioning of the shoulder belt portion of the seat belt across the chest of the vehicle occupant. Another improvement made to vehicle seat belt systems is the inclusion of a load limiting member in the seat belt retractor. The load limiting member absorbs high levels of restraining force exerted by the seat belt webbing on the occupant preventing injury. A further development was the introduction of a dual mode limiting retractor that provided at least two levels of load limiting based on occupant size. While these improvements in seat belt system design have increased comfort and enhanced the performance of safety restraint systems. Improvements are still needed to address the safety restraint requirements of the younger or smaller passengers and especially children who have exceeded the weight limitation of child seats.

Thus, a new and improved safety restraint system that is adjustable to address the safety requirements of adult and children passengers is needed. The new and improved system should provide a comfortable safety restraint as well as meet all of the appropriate restraint performance requirements.

BRIEF SUMMARY OF THE INVENTION

In an aspect of the present invention, a safety restraint system for a vehicle is provided. The safety restraint system has a seat belt webbing for restraining an occupant of the vehicle, a seat belt retractor, a deflector, a height adjuster, a latch plate deflector, a buckle and a communication link. The seat belt retractor mounted to a first structural member of the vehicle for securing the seat belt to the vehicle and allowing protraction and retraction of the seat belt. The retractor has at least two load limiting modes. The deflector receives the seat belt webbing and directs the seat belt webbing across the shoulder of the occupant. The height adjuster secures the deflector to a second structural member of the vehicle. The deflector is positionable between at least two locations along the height adjuster. The latch plate deflector receives the seat belt webbing and redirects the seat belt webbing across the lap of the occupant. The buckle receives and removably secures the latch plate deflector when the seat belt is in use by the occupant. The communication link is attached at a first end adjacent the height adjuster and at a second end to the retractor for switching the retractor from at least one load limiting mode to another.

In another embodiment of the present invention, the height adjuster includes a first deflector location corresponding with a first load limiting mode and a second deflector location corresponding with a second load limiting mode.

In still another embodiment of the present invention, the height adjuster includes a third deflector location corresponding with the first load limiting mode and the fourth deflector location corresponding with the second load limiting mode.

In still another embodiment of the present invention, the communication link is a pull cable.

In still another embodiment of the present invention, the retractor is an adaptive load limiting retractor.

In yet another embodiment of the present invention, a method for adjusting a safety restraint system of a vehicle is provided. The safety restraint system has a seat belt webbing for restraining an occupant of the vehicle, a seat belt retractor mounted to a first structural member of the vehicle for securing the seat belt to the vehicle and allowing protraction and retraction of the seat belt, the retractor having at least two load limiting modes, a deflector for receiving the seat belt webbing and directing the seat belt webbing across the shoulder of the occupant, a height adjuster for securing the deflector to a second structural member of the vehicle, a latch plate deflector for receiving the seat belt webbing and redirecting the seat belt webbing across the lap of the occupant and a buckle for receiving and removably securing the latch plate deflector when the seat belt is in use by the occupant. The method includes monitoring the height adjuster, which secures the deflector to a second structural member of the vehicle, to determine the location of the deflector along the height adjuster, wherein the deflector is positionable between at least two locations along the height adjuster and communicating the location of the deflector along height adjuster using a communication link attached at a first end adjacent the height adjuster and at a second end to the retractor, and switching the retractor from at least one load limiting mode to another.

DETAILED DESCRIPTION OF THE INVENTION

Figure 1:
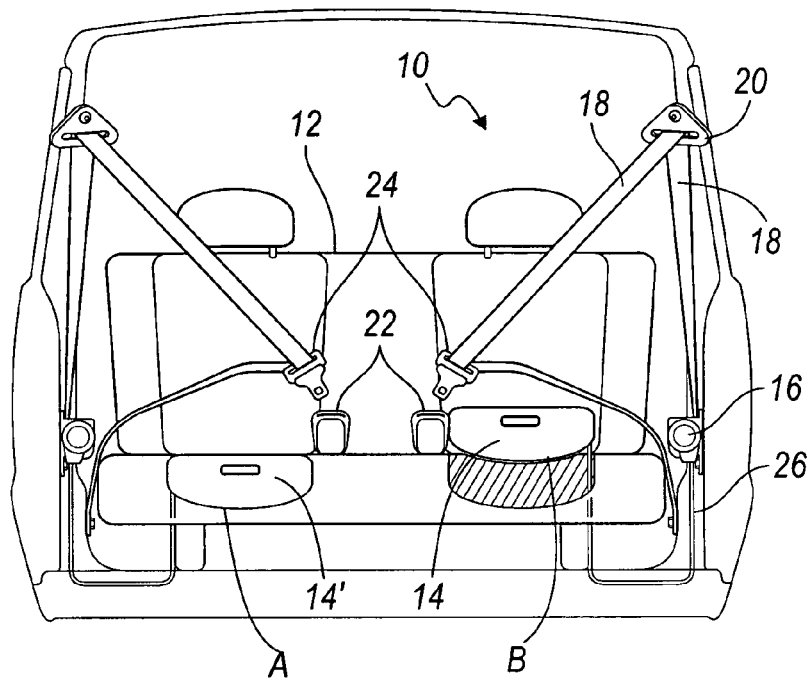
FIG. 1 illustrates a prior art adaptive child belt system having integrated booster cushion.

Referring now to FIG. 1, a prior art child safety restraint system 10 is illustrated. Prior art system 10 includes a conventional seat belt system 11 and an automotive seat 12 fitted with integrated booster cushions 14 and 14'. Conventional seat belt system 11 includes a retractor 16, seat belt webbing 18, a D-ring or deflector 20, a seat belt buckle 22 and a latch plate 24. As conventionally known, the seat belt retractor 16 is mounted to a structural member of the vehicle and retracts the seat belt 18 when the seat belt is not in use and allows protraction of the webbing from the retractor when a vehicle occupant is utilizing the seat belt.

The seat belt retractor 16 is a dual mode load limiting retractor that changes load limiting modes based on the type and size of the vehicle occupant seated in seat 12. Seat belt webbing 18 is threaded through D-ring or deflector 20 thereby changing the direction of the seat belt webbing so that it may be secured across the vehicle occupant. Webbing 18 is typically threaded through latch plate 24 that is received in and securely engages to buckle 22. Seat belt webbing 18 continues from latch plate 24 crossing the lap of the seated occupant and is fixedly secured at a second end to the vehicle structure.

Integrated booster cushions 14, 14' are moveably secured to seat 12 and allow a child occupant to utilize the conventional seat belt system, such as system 11 described above, by raising the child above the seat. The integrated booster cushions have a first stored position, as illustrated in FIG. 1 and indicated by reference letter A, and a second elevated position indicated by reference letter B. When the integrated booster cushions are in the stored position A an adult passenger may be seated at seat 12 and comfortably utilize a conventional seat belt system as described above. When the integrated booster cushion 14 is placed in position B, a child may be placed on the elevated cushion and utilize the same safety belt restraint system 11 as used with adult occupants without adjustment.

Pull cables 26, 26' are connected at their first ends to the integrated booster cushions 14, 14' and to dual mode retractor 16, 16' at their second ends. The dual mode retractors 16, 16' are actuated and switched from a high load limiting mode to a low load limiting mode when the booster cushions 14, 14' move from the stored position A into the in-use position B. More specifically, the actuation of pull cable 26 switches the load limiting level of retractor 16 to a predefined load limiting level that is appropriate for a child passenger.

Figure 2:
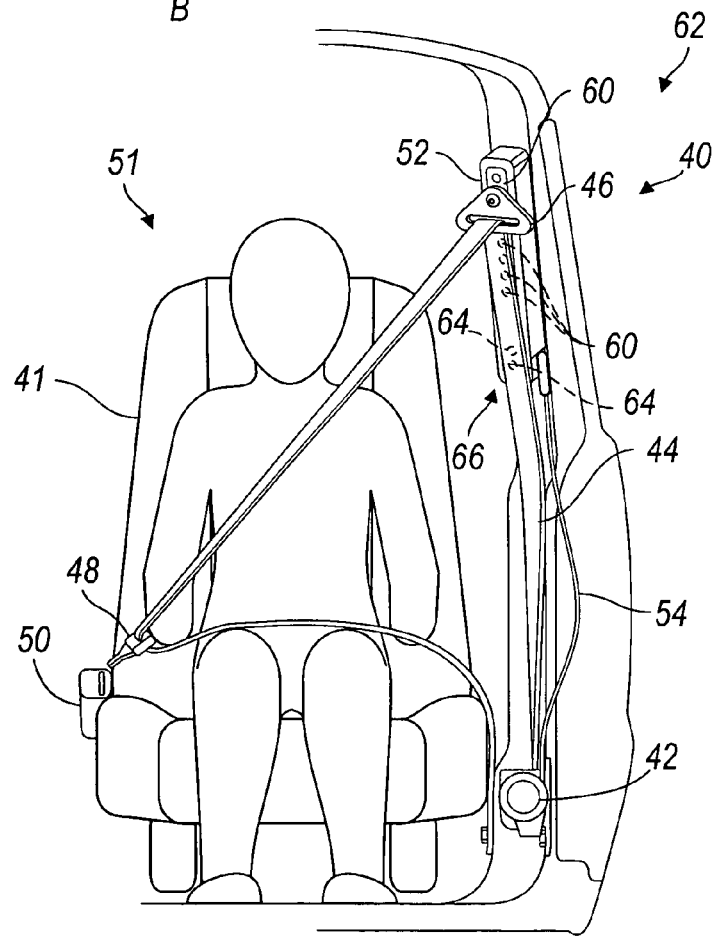
FIG. 2 is a schematic diagram of a seat belt system configured to restrain a child passenger, wherein the D-ring is positioned in a first position to accommodate an adult, in accordance with the present invention.

Referring now to FIG. 2, a new and improved seat belt system 40 is illustrated, in accordance with an embodiment of the present invention. Seat belt system 40 is configured for use by vehicle occupants of various sizes (i.e. adults as well as children) seated in automotive seat 41. FIG. 2 illustrates the use of seat belt system 40 by an adult size occupant. Seat belt system 40 includes a dual mode load limiter retractor 42, a seat belt webbing 44, a deflector, d-ring or guide 46, a latch plate 48, a buckle 50 and a height adjuster 52. Further, a mechanical pull cable 54 is connected at a first end to retractor 42 and at a second end to deflector 46, which is coupled to height adjuster 52. Height adjuster 52 may be secured to a vehicle structure or to the upper portion 51 of seat 41. While a dual mode load limiting retractor is shown and described, the present invention contemplates the use of adaptive load limiting retractors and retractors having more or less load limiting levels or modes. For example, an adaptive load limiting retractor such as the one described in U.S. Pat. No. 6,659,505 assigned to Autoliv ASP, Inc. may be used in place of retractor 42, and is hereby incorporated by reference. Furthermore, the present invention contemplates that retractor 42 is a seat belt retractor that has load limiting capability, as well as, an automatic locking retractor (ALR) mechanism such as the retractors described in U.S. Pat. Nos. 5,944,277 and 6,062,502 assigned to Autoliv Development Abz of Sweden and hereby incorporated by reference.

Retractor 42 secures seat belt webbing 44 at a first end to a vehicle structural member and allows retraction and protraction from retractor 42 in a conventional manner. Seat belt webbing 44 is threaded through a deflector, d-ring or guide 46 that redirects the webbing across the chest of the occupant. To secure the webbing over the chest of the occupant the webbing is threaded through a latch plate 48 that is releaseably received within a buckle 50. The webbing continues from the latch plate 48 across the lap of the occupant and is secured to the vehicle seat 41 or to another structural member of the vehicle completing the attachment of the seat belt to the vehicle.

In an embodiment of the present invention, deflector 46 is movably secured to height adjuster 52. More specifically, height adjuster 52 has an elongated body, channel or guide rail having multiple locations 60, 64 at which to position deflector 46. For example, a first range of attachment locations 60 are located at an upper portion 62 of height adjuster 52. First range of attachment positions 60 are configured to removably secure deflector 46 at locations along height adjuster 52, so that the shoulder belt portion of the seat belt fits comfortably over larger or adult sized occupants. Further, a second range of attachment positions 64 are located at a lower portion 66 of height adjuster 52. Second range of attachment positions 64 are configured to removably secure deflector 46 at locations along height adjuster 52 to comfortably restrain small or child-sized occupants. An example of a height adjuster that may be used in embodiments of the present invention is disclosed in U.S. Pat. No. 4,989,900, hereby incorporated by reference.

Figure 3:
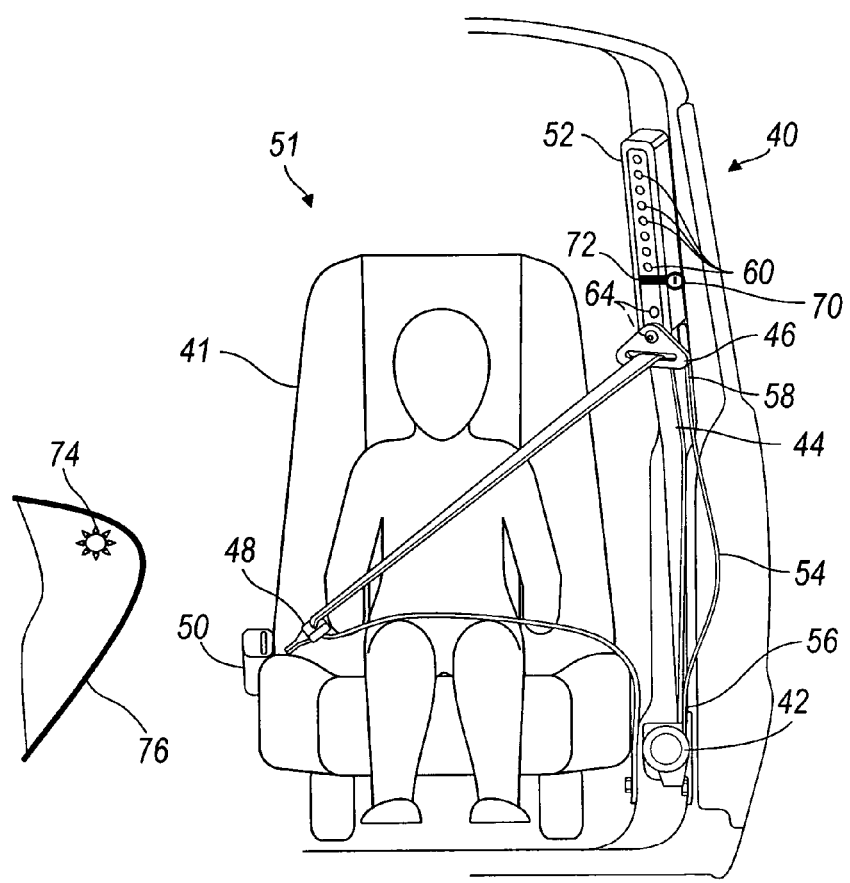
FIG. 3 is a schematic illustration of a child restraint system, wherein the D-ring is positioned at a second location along the height adjuster to accommodate a child passenger, in accordance with an embodiment of the present invention.

With reference to FIG. 3, seat belt system 40 is shown in use by a child occupant, in accordance with an embodiment of the present invention. When a child occupant is using seat belt system 40, deflector 46 is placed in the second range of attachment positions 64 on lower portion 66 of height adjuster 52. By positioning deflector 46 at the lower portion 66 of height adjuster 52 the seat belt webbing 44 passes over the shoulder of the child occupant and not across the neck of the child resulting in a more comfortable and more appropriate safety restraint. Of course, the present invention contemplates the use of more or less attachment locations along height adjuster 52 to provide the required height adjustment of deflector 46 for a given occupant size.

Figure 4A:
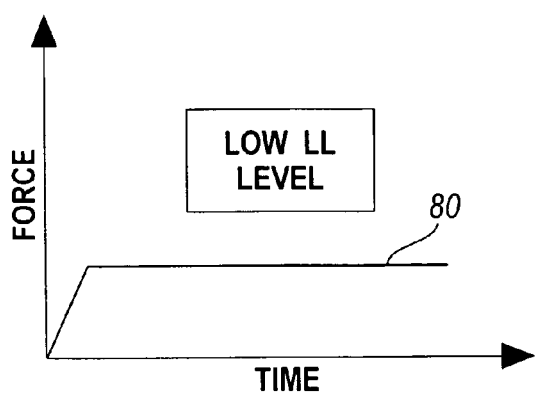
FIGS. 4a and 4b are graphs illustrating two different load limiting levels corresponding to the different load limiting modes of retractor operation, in accordance with the present invention.
Figure 4B:
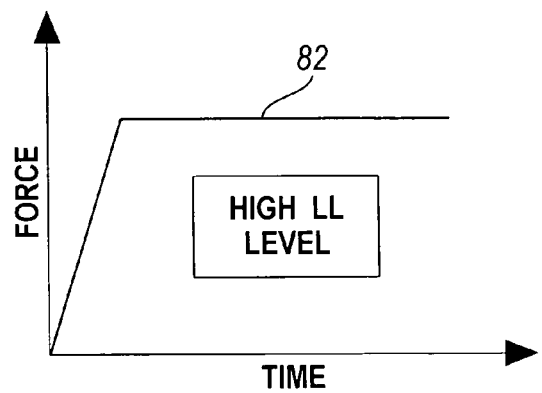

An additional feature of the present invention is to adjust the load limiting modes or levels of retractor 42 based on occupant size. This is accomplished by pull cable 54 that, as previously described, is attached to the retractor 42 at a first end 56 and to the deflector 46 at a second end 58. More specifically, when deflector 46 is moved from the lower portion 66 to the upper portion 62 or vice versa, pull cable 54 is actuated and causes retractor 42 to switch load-limiting levels. For example, if a child sized occupant is using system 40 then deflector 46 will be positioned in the second range of attachment positions 64 on lower portion 66 of height adjuster 52 and the load limiting mode of retractor 42 will be set at a low load limiting (LL) level 80 as illustrated in FIG. 4a. However, if an adult sized occupant is using system 40 then deflector 46 will be positioned in the first range of attachment positions 60 on upper portion 62 of height adjuster 52 and the load limiting mode of retractor 42 will be set at a high load limiting (LL) level 82, as illustrated in FIG. 4b.

In yet another embodiment of the present invention a locking member 70 is mounted in height adjuster 52, as shown in FIG. 3. Locking member includes a blocking arm 72 that obstructs the travel of deflector 46 and prevents the deflector from occupying the lower portion 66 of height adjuster 52. Thus, accidental activation of the low level load limiting mode is prevented. Further, the locking member is activated, preferably, using the ignition key, for example. Additionally, the present invention provides an indicator lamp 74, preferably, located on the instrument panel 76. The indicator lamp 74 is activated and illuminates when the deflector is occupying the lower portion 66 of height adjuster 52 and retractor 42 is switched to the low load limiting level 80. Thus, the present invention provides a clear and conspicuous signal to the vehicle occupants that retractor 42 is in the low load limiting level or mode.

Of course, the present invention contemplates other mechanisms for communicating the location of deflector 46 along height adjuster 52 to retractor 42 to switch the load limiting modes of the retractor. For example, a sensor (not shown) in the height adjuster could also be employed to communicate the location of deflector 46 in height adjuster 52 to retractor 42 via an electrical line or wireless device. The wireless device includes a wireless transmitter in communication with the sensor disposed in the height adjuster and the transmitter is configured to send RF signals, for example, to a receiver in the retractor. The sensor and transmitter in the height adjuster may include a piezostack and data storage elements. The retractor will switch load limiting modes depending on the signal transmitted by the transmitter and received by the receiver.

While the above description constitutes the preferred embodiment of the present invention, it will be appreciated that the invention is susceptible to modification, variation and change without departing from the proper scope and fair meaning of the accompanying claims.

The invention claimed is:

1. A safety restraint system for a vehicle, the safety restraint system comprising:
    a seat belt webbing for restraining an occupant of the vehicle;
    a seat belt retractor mounted to a first structural member of the vehicle for securing the seat belt to the vehicle and allowing protraction and retraction of the seat belt, the retractor having at least two load limiting modes;
    a deflector for receiving the seat belt webbing and directing the seat belt webbing across the shoulder of the occupant;
    a height adjuster for securing the deflector to a second structural member of the vehicle, wherein the deflector is positionable between at least two locations along the height adjuster including a first deflector location associated with a relatively smaller size occupant and a second deflector location associated with a relatively larger size occupant;
    a latch plate deflector for receiving the seat belt webbing and redirecting the seat belt webbing across the lap of the occupant;
    a buckle for receiving and removably securing the latch plate deflector when the seat belt is in use by the occupant; and
    a communication link attached at a first end adjacent the height adjuster and at a second end to the retractor for switching the retractor to a low load limiting mode when the height adjuster is positioned to the first deflector location and to a high load limiting mode when the height adjuster is positioned to the second deflector location.

2. The safety restraint system of claim 1, wherein the height adjuster includes a third deflector location corresponding with the low load limiting mode and a fourth deflector location corresponding with the high load limiting mode.

3. The safety restraint system of claim 1, wherein the communication link is a pull cable.

4. The safety restraint system of claim 1, wherein the first end of the communication link is a wireless transmitter and the second end of the communication link is a receiver.

5. The safety restraint system of claim 1, wherein the retractor is an adaptive load limiting retractor.

6. The safety restraint system of claim 1, further comprising an indicator in communication with the retractor, wherein the indicator receives a signal to illuminate based on the load limiting mode of the retractor.

7. The safety restraint system of claim 1, further comprising a locking member disposed adjacent to height adjuster and including a blocking member removeably disposed within the height adjuster for selectively obstructing the deflector from traveling along the height adjuster, preventing accidental switching of the retractor from one of the low and high load limiting modes to the other one of the low and high load limiting modes.

8. A method for adjusting a safety restraint system of a vehicle, the safety restraint system having a seat belt webbing for restraining an occupant of the vehicle, a seat belt retractor mounted to a first structural member of the vehicle for securing the seat belt to the vehicle and allowing protraction and retraction of the seat belt, the retractor having at least two load limiting modes including a low load limiting mode and a high load limiting mode, a deflector for receiving the seat belt webbing and directing the seat belt webbing across the shoulder of the occupant, a height adjuster for securing the deflector to a second structural member of the vehicle, a latch plate deflector for receiving the seat belt webbing and redirecting the seat belt webbing across the lap of the occupant and a buckle for receiving and removably securing the latch plate deflector when the seat belt is in use by the occupant, the method comprising:
    monitoring the height adjuster, which secures the deflector to a second structural member of the vehicle, to determine the location of the deflector along the height adjuster, wherein the deflector is positionable between at least two locations along the height adjuster including a first deflector location associated with a relatively smaller size occupant and a second deflector location associated with a relatively larger size occupant;
    communicating the location of the deflector along the height adjuster using a communication link attached at a first end adjacent the height adjuster and at a second end to the retractor; and
    switching the retractor to the low load limiting mode when the height adjuster is positioned to the first deflector location and to a high load limiting mode when the height adjuster is positioned to the second deflector location.

9. A safety restraint system for a vehicle, the safety restraint system comprising:
    a seat belt webbing for restraining an occupant of the vehicle;
    a seat belt retractor mounted to a first structural member of the vehicle for securing the seat belt to the vehicle and allowing protraction and retraction of the seat belt, the retractor having at least two load limiting modes;
    a deflector for receiving the seat belt webbing and directing the seat belt webbing across the shoulder of the occupant;
    a height adjuster for securing the deflector to a second structural member of the vehicle, wherein the deflector is positionable between at least two locations along the height adjuster including a first deflector location associated with a relatively smaller size occupant and a second deflector location associated with a relatively larger size occupant;

a latch plate deflector for receiving the seat belt webbing and redirecting the seat belt webbing across the lap of the occupant;

a buckle for receiving and removeably securing the latch plate deflector when the seat belt is in use by the occupant; and a means for communicating the location of the deflector along the height adjuster, wherein the means is attached at a first end adjacent the height adjuster and at a second end to the retractor for switching the retractor to a low load limiting mode when the height adjuster is positioned to the first deflector location and to a high load limiting mode when the height adjuster is positioned to the second deflector location.

10. The safety restraint system of claim 9, wherein the height adjuster includes a third deflector location corresponding with the low load limiting mode and a fourth deflector location corresponding with the high load limiting mode.

11. The safety restraint system of claim 9, wherein means for communicating the location of the deflector is a pull cable.

12. The safety restraint system of claim 9, wherein the retractor is an adaptive load limiting retractor.

* * * * *